United States Patent [19]

Pearson, Jr.

[11] Patent Number: 4,588,335
[45] Date of Patent: May 13, 1986

[54] QUICK CHANGE TOOL RETENTION DEVICE FOR POWER OPERATED MECHANISM

[76] Inventor: Claude C. Pearson, Jr., Rte. 1, Box 145, Irving, Ill. 62051

[21] Appl. No.: 650,469

[22] Filed: Sep. 14, 1984

[51] Int. Cl.4 .............................................. B23B 31/08
[52] U.S. Cl. ................................. 408/239 R; 279/76; 279/79
[58] Field of Search ................... 279/1 A, 1 B, 1 TS, 279/76, 79, 85, 86, 87, 97; 408/239 R, 239 A

[56] References Cited

U.S. PATENT DOCUMENTS

| | | | |
|---|---|---|---|
| 885,392 | 4/1908 | Spets | 279/76 |
| 1,833,236 | 11/1931 | Smith | 279/19.5 |
| 2,350,565 | 6/1944 | Mills | 279/76 |
| 2,885,231 | 5/1959 | Smith | 279/97 X |
| 3,576,076 | 4/1971 | Weissman | 279/97 X |
| 3,604,735 | 9/1971 | Hoffmeister | 279/76 X |
| 3,726,533 | 4/1973 | Lafferty, Sr. | 279/1 B X |
| 4,057,240 | 11/1977 | Sigott | 279/76 X |
| 4,271,735 | 6/1981 | Deaman | 408/239 R X |
| 4,349,929 | 9/1982 | Dewey | 279/1 A X |
| 4,402,519 | 9/1983 | Meaden et al. | 279/76 |

FOREIGN PATENT DOCUMENTS

| | | | |
|---|---|---|---|
| 699619 | 12/1964 | Canada | 279/76 |
| 31586 | 5/1910 | Sweden | 279/76 |

Primary Examiner—Gil Weidenfeld
Assistant Examiner—Glenn L. Webb
Attorney, Agent, or Firm—Edwin E. Greigg

[57] ABSTRACT

A quick change tool retention device for attachment to a power operated mechanism, such as a power operated hand drill, provided with a body portion and a release means attached to a spring-biased leg portion so that a tool, provided with a groove for interlock with the leg portion, can be brought into a keyway and locked in place until such time as the release button is depressed, thereby depressing the leg portion against the spring biasing and releasing the tool from retention via the groove.

9 Claims, 9 Drawing Figures

U.S. Patent
May 13, 1986
4,588,335
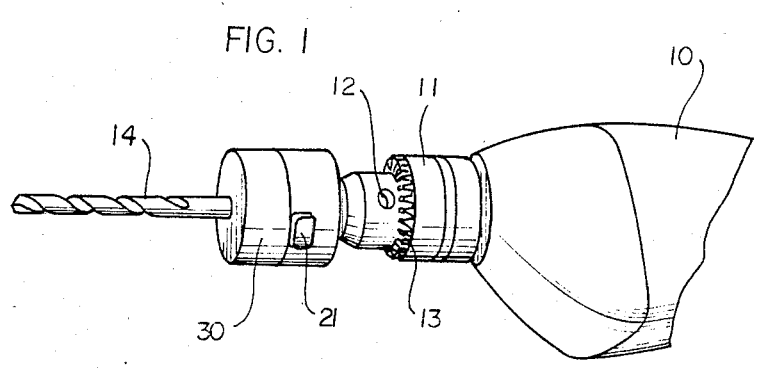
FIG. 1
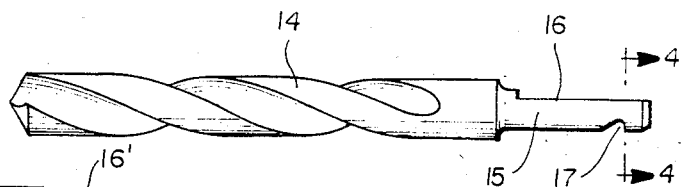
FIG. 2
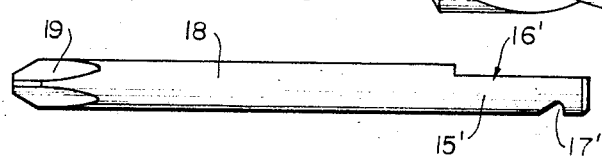
FIG. 3
FIG. 4
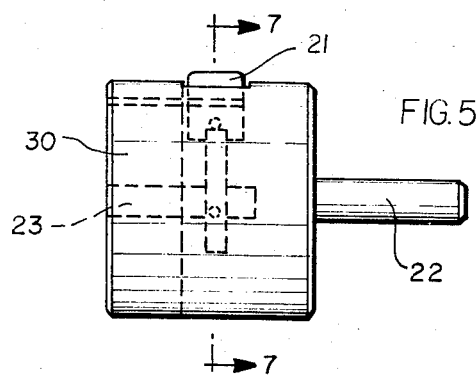
FIG. 5
FIG. 6
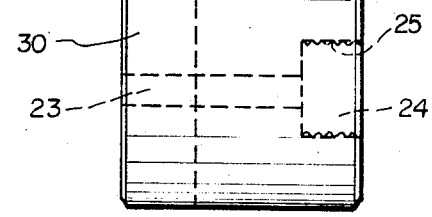
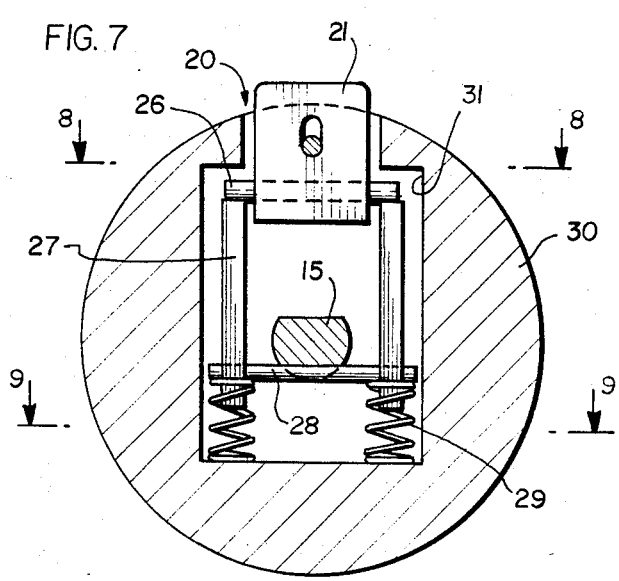
FIG. 7
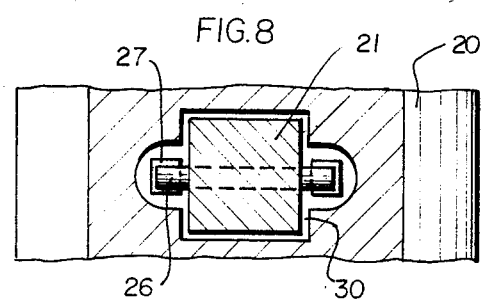
FIG. 8
FIG. 9
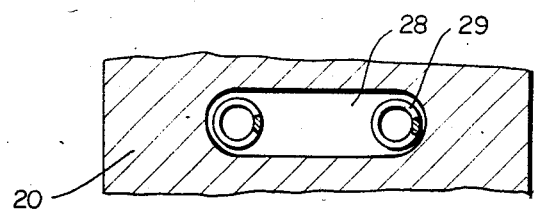

QUICK CHANGE TOOL RETENTION DEVICE FOR POWER OPERATED MECHANISM

BACKGROUND OF THE INVENTION

This invention relates to an accessory device applicable to a power tool such as a power hand drill which allows for a quick change of the tool being used in the chuck of the mechanism. The accessory is interposed between the drill and the tool, typically by retaining the tool retention device in the drill chuck. The device according to the invention allows for extremely quick changing of the tool so that merely by depressing a button on the device is the tool released from its fixed operative position. No longer is it necessary to use a key to unlock the drill chuck first before removing the bit or other tool being used so as to change it.

There are other devices reflecting numerous attempts to improve upon hand and power tools to make them more readily useable or more quickly changeable. An example of this is the patent to Smith U.S. Pat. No. 1,833,236 in which the tool retainer device is spring loaded but in which action must be taken against the spring pressure and also a rotational movement applied so as to lock a pin and therefore the head of the tool.

Swedish Pat. No. 31586 shows a J-clamp about the upper portion of which is positioned a spring, so that when a tool is to be removed from a hole in the body, the head of the J-clamp is depressed.

The patent to Hoffmeister U.S. Pat. No. 3,604,735 depicts another locking means in which a member is spring-loaded so that a push on the end will cause a hook to be released from the tool being held.

Canadian Pat. No. 699,619 teaches a quick change chuck for drills using a canted annular member that is activated by a button on the side of the chuck.

The patent to Richard U.S. Pat. No. 2,215,015 and to Beck U.S. Pat. No. 3,255,792 also teach spring-biased tool holders that allow a tool to be released and replaced quickly.

None of the foregoing prior art has achieved the simplicity and the ease of manufacture and of change of a tool that is achieved by the instant invention.

OBJECTS AND SUMMARY OF THE INVENTION

It is an object of this invention to provide a quick change tool retention device for a power operated mechanism such as power operated hand drills that will firmly lock the shaft of the tool to the tool retention device but yet allow quick and easy release thereof for change of the tool.

It is another object of the invention to provide a universal means by which the quick change tool retention device may be applied to a drill chuck or power operated mechanism, such as a drill press.

It is still another object of the invention to provide a device which is easy to manufacture and which operates reliably in use with little fear of breakage. Other objects and advantages will appear from the following description of the preferred embodiment taken in conjunction with the accompanying drawings in which:

FIG. 1 is a perspective view of a quick change tool retention device mounted in the chuck of a hand power operated drill;

FIG. 2 shows a drill bit which has been adapted for use in the retention means within the quick change tool retention device;

FIG. 3 shows in similar fashion a screw driver bit of Phillips configuration which has been adapted for use with the retention means of the quick change tool retention device;

FIG. 4 shows an end view taken through FIG. 2 to show the cut-away shape of the drill bit for use with the invention;

FIG. 5 is a side view of the quick change tool retention device in partial cut-away showing the aperture for insertion of a tool, a shaft for reception within a drill chuck and the release mechanism for the tool;

FIG. 6 shows an alternative embodiment of a means for attachmet of the device to a power operated mechanism;

FIG. 7 is a cross-sectional view taken through FIG. 5 showing the tool retention means and its spring biased members;

FIG. 8 is a view taken along line 8—8 of FIG. 7 showing the top most portion of the quick change tool retention device and the construction of the release button thereon; and FIG. 9 is a partial cross section along line 9—9 of FIG. 7 showing the base of the aperture within which the retention means sits and the springs by which it is biased.

DESCRIPTION OF THE PREFERRED EMBODIMENT

Referring now to the drawings, and more particularly to FIG. 1, it will be seen that the reference 10 refers to the power operated drill, to which a chuck 11 has been applied and tighted by a key way 12 in cooperation with teeth 13. Into the chuck of the drill has been applied a quick change tool retention device in accordance with the invention, generally referred to as 30, and a release button 21 for the release of a drill bit 14. The drill bit 14 can be inserted into the aperture 23, best shown in FIG. 5, where it will be locked in place by the tool retention mechanism with its biasing springs.

FIGS. 2 and 3 show two embodiments of tools, that in FIG. 2 being a drill bit such as 14 provided with a tail shaft 15, a longitudinal portion of which has been cut away at 16 and the tool, near an extremity of the tail shaft is fitted with a groove 17 for reception in the tool retention means.

In FIG. 3 the tool depicted is a screw driver 18, fitted with the distinctive Phillips shape 19, this tool also being provided with a tail shaft 15', a cutaway 16' and a groove 17' for reception within the tool retention means.

In FIG. 4, taken as a view along line 4—4 of FIG. 2, this cross sectional view of the end of the tail shaft 15 of the drill bit shows better the cutaway into a substantially D shape of the tail shaft, the cutaway allowing a key-like fitting of the tool so that it is always inserted properly for interlock within the tool retention mechanism.

FIG. 5 shows the quick change tool retention device body 30, the key way or aperture for insertion of the tool, at 23, the release button 21 and an axially disposed shaft 22 which is brought into the drill chuck of the power operated tool so that it may be fixed in place and retained there.

FIG. 6 again shows the quick change tool retention device body 30 and the aperture 23 for reception of the tool, and also the button 21, but in this case another embodiment of attachment means is shown comprising a bore 24 in the opposite extremity of the body from aperture 23, such bore having applied to it internal threads as indicated at 25, allowing the device body to be screwed on a power operated mechanism in a female to male screw fit connection.

FIG. 7 illustrates in cross sectional view the operative parts of the tool retention and release mechanism, including the body 30 and aperture within the body 20 through which body projects a release button 21, which button is attached to a bar 26 attached to leg portions 27 which sit atop springs 29, a bar 28 being provided horizontally at the top of the springs, such bar being arranged for locking connection with the groove 17 in a tool 15 so as to lock the same in place. The aperture within which the mechanism sits is defined by a wall 31, and it can be appreciated by the reader that this device is typically molded in two parts with the aperture 20 and wall 31 formed in the rear portion of the device body, and the tool insertion aperture 23 molded into the forward portion of the device body. The two parts can then be mated as by epoxy or other gluing technique. It is also conceivable that threads could be applied between the two portions of the body so that the forward portion would be screwed on the rear portion, once the tool retention device was placed in its appropriate aperture. Still another possibility, or embodiment of this tool retention device would be to provide that the spring and leg portion are a unitary element such as an ovoid-shaped loop of spring steel, the side portions of which could be depressed together so that its width was narrowed, whence the device could be insertable through the aperture 20, and when inserted through the aperture the deformation would cease and the spring steel loop would regain its original ovoid shape. The lowest portion of the ovoid loop could engage a tang or groove on the tool so that the retention mechanism would work in substantially similar fashion, releasing the tool tailshaft when the button was depressed.

FIG. 8 is a partial cut-away view of FIG. 7, taken along line 8—8 thereof, in which the button 21 is shown, the aperture 20 the upper bar means 26 and the leg portions 27, while FIG. 9 shows a similar partial cut-away of the tool retention device but along line 9—9 in FIG. 7, so that the base of the tool retention means is shown including the springs 29 and, the bar 28 which serves to retain the tool in place by engagement with the groove in the tail shaft of the tool.

In operation, the device according to the invention would work substantially as follows:

with button 21 depressed a tool would be brought into aperture 23 and depressed into the hole 23 up to the point where the tail shaft 15 would meet bar 28 and passing beyond bar 28 the button 21 would be released and the groove 17 would become locked to bar 28. When one wanted to change the tool in the quick change tool retention device, one would merely grasp the tool and depress the button 21 whereby the tool retention device would be depressed upon springs 29 and bar 28 would be brought out of contact with groove 17, whereby the tool could be removed from the aperture 23 and replaced with another. The flat face 16, 16' of the tool matches a like face in the body 30 which prevents rotation of the tool within the body so that the tool rotates with the body.

It should be understood that the various parts of this invention may be made from any number of different kinds of materials without affecting the herein described construction of its details, which themselves are subject to modification and change in shape without departing from the spirit and scope of the contents of the appended claims.

What is claimed and desired to be secured by Letters Patent of the United States is:

1. A quick-change tool retention device for a power-operated mechanism, said device comprising a body member provided with front and rear walls and an external peripheral wall, an interior cavity in said body member, said interior cavity having side walls perpendicular to a longitudinal axis of said body member and a bottom face, said body member further having an axial aperture extending from said front wall into said interior cavity in said body member, attachment means provided by said body member for securing said body member to said power operated mechanism, an aperture in said external peripheral wall extending into said interior cavity perpendicular to said axis of said body member, said body member further provided with an actuator member extending through said aperture in said exterior peripheral wall into said interior cavity, a spring biasing means in said interior cavity abutting the wall of the interior cavity opposing the aperture, said actuator member being associated with said spring-biasing means in said interior cavity and arranged to retain a shank end of a tool inserted through said axial aperture, said spring-biasing means being arranged to move between a first tool-retaining position and a second tool-releasing position upon pressure being applied to said actuator member, whereby a given tool may be quickly installed and removed from said tool retention device.

2. A quick-change tool retention device as claimed in claim 1, further wherein said actuator member includes a leg portion arranged to move within said interior cavity, said leg portion being provided with means arranged to engage means on said shank end of said tool to retain the same in place.

3. A quick-change tool retention device as claimed in claim 2, further wherein said spring biasing means comprises at least one spring means acting to bias said leg portion so that said actuator member extends radially beyond said external peripheral wall.

4. A quick-change tool retention device as claimed in claim 3, further wherein the means on said leg portion comprises a bar and the means on said shank end of said tool is a groove in said shaft end thereof.

5. A quick-change tool retention device as claimed in claim 4, further wherein said leg portion comprises a bifurcated member and said bar extends in normal relation therewith.

6. A quick-change tool retention device as claimed in claim 5, further wherein said bifurcated member has two legs and is substantially H-shaped, and said at least one spring means comprises two springs, one of said springs being provided on a lower extent of each of said legs.

7. A quick-change tool retention device as claimed in claim 1, further wherein said attachment means comprises a shaft disposed on said rear wall of said body member and extending axially therefrom.

8. A quick-change tool retention device as claimed in claim 11, further wherein said attachment means comprises an internally-threaded bore in said rear wall, the threads of which are adapted to be screwed onto complemental threads on said power-operated mechanism.

9. A quick-change tool retention device as claimed in claim 5, further wherein said actuator member comprises a button attached to a second bar and said second bar is affixed to an upper extremity of said bifurcated member.

* * * * *